United States Patent [19]

Dannatt

[11] Patent Number: 4,957,179

[45] Date of Patent: Sep. 18, 1990

[54] TAPE MODULE FOR A MODULAR MAILING MACHINE

[75] Inventor: Hugh S. Dannatt, Bethel, Conn.

[73] Assignee: Pitney Bowes Inc., Stamford, Conn.

[21] Appl. No.: 286,119

[22] Filed: Dec. 19, 1988

Related U.S. Application Data

[62] Division of Ser. No. 134,626, Dec. 17, 1987, Pat. No. 4,852,786.

[51] Int. Cl.[5] .......................... B41J 3/00; G01G 19/40

[52] U.S. Cl. ........................................ 177/145; 101/91

[58] Field of Search ...................... 101/91, 93.8, 93.21; 177/4, 145; 364/464.02, 464.03; 235/101

[56] References Cited

U.S. PATENT DOCUMENTS

| | | | |
|---|---|---|---|
| 3,877,531 | 4/1975 | Storace et al. | 177/3 X |
| 4,611,736 | 9/1986 | Gavronsky et al. | 101/228 X |
| 4,742,878 | 5/1988 | Freeman et al. | 177/145 X |
| 4,865,139 | 9/1989 | Cohen et al. | 177/145 X |

*Primary Examiner*—Clifford C. Crowder
*Attorney, Agent, or Firm*—Charles G. Parks, Jr.; David E. Pitchenik; Melvin J. Scolnick

[57] ABSTRACT

The modular mailing machine has a plurality of modules mounted in such a manner as to form a single process station. At the process station, a meter module is mounted in spaced relationship to a platen module. A tape module is mounted in the mailing machine; such the tape module tape track is supported in a generally cantilevered manner. A tape positioner selectively positions a support from a home position to second position longitudinally removed from the home position to cause the tape track to be located between the meter and platen modules. A tape feed selectively feeds one of a plurality of imprinting tapes to and through the tape track such that the fed imprinting tape resides within the tape track when the tape track is in the second position.

4 Claims, 10 Drawing Sheets

TAPE MODULE FOR A MODULAR MAILING MACHINE

This is a division of Ser. No. 134,626 filed Dec. 17, 1987, now U.S. Pat. No. 4,852,786.

BACKGROUND OF THE INVENTION

This invention relates to imprinting systems, such as, postage meter mailing machine, which systems are used to imprint information on a sheet-like median and, more particularly, to a mailing machine tape supply assembly wherein the tape supply assembly has a modular construction.

In the mail processing field, it is most desirable for a system operator to be able to deliver to mail processing equipment a batch of "Mixed mail", that is, the batch is comprised of a large number of envelopes of varying dimensions, i.e., size, thickness and weight. The ability of a mail processing system to process a large variety of mixed mail eliminates the need of the system operator to perform the preliminary steps of presorting the mail. It is further desirable for mail processing equipment to be able to weigh the individual envelopes and affix the appropriate postage value indicia in accordance with the envelope weight. It is generally considered advantageous if the mail processing equipment can imprint a quality indicia upon envelopes varying in thickness from that of a postcard to approximately a quarter (¼) of an inch. It is also considered advantageous for the mail processing equipment to possess the capability to imprint a postage indicia on tape strips which can be affixed to packages too large to be accepted by the mail processing equipment.

It is known to provide mail processing equipment comprised of a feeder for singularly delivering envelope in series to a transport assembly. The transport assembly deposits the envelope on the scale for weighing. After a sufficient time to assure a true scale reading of the envelope weight, commonly referred to as "weight on the pause", the transport assembly again assumes control over the envelope and delivers the envelope to the mailing machine.

The mailing machine is most commonly comprised of a integral transport assembly and attached rotatory print drum type postage meter. The mailing machine transport assembly assumes speed control over the envelope performing any necessary speed adjustments to the envelope required to match the envelopes traversing speed with the imprinting speed to the postage meter print drum to promote a quality indicia print. It is known for the postage meter to include a value setting mechanism under the influence of the scale which cause the postage meter value setting mechanism to adjust the postage meter printing mechanism for printing of the appropriate postage rate on the approaching envelope according to the envelope weight as determined by the scale.

The mail processing system depicted above has as its primary objectives (i) the capability to process a dimensionally wide variety of envelopes particularly with respect to thickness and weight (ii) as fast as possible in terms of envelope per second (iii) while applying a quality postal indicia. The described mail processing system has several limiting factors with respect to increasing throughput relative to system cost. One such limiting factor is represented by the time required in transporting the envelopes from one process station to another. Another limiting factor is reflected in the time necessary to obtain an accurate weight from the scale. While such factors as transport time and weighing time can conceivable be decreased by incorporating advance system techniques, the rule of diminishing returns predicts that small improvements in system throughput by such an incorporation would be achievable at disproportional increases in system cost.

One possible alternative means of increasing the throughput of such mail processing systems is to provide multiple scales and a suitable transport system such that the scales are placed in alternative use. Such an arrangement would conceivably allow overlapping of system process or function to achieve a not insignificant increase system through. However, such an alternative represents added cost from both an equipment and system complexity standpoint.

In order for the mail processing equipment to accommodate the processing of packaged mail, it is desirable to include the capability within the mail processing equipment by a suitable mechanism to produce postage indicia printed tape strip which can be adhered to packaged mail. Such a mechanism optimally would not detract from the speed capability of the mail processing equipment to nominally process envelope mail.

SUMMARY OF THE INVENTION

It is an objective of the present invention to present a tape mechanism of a generally module form integrated into a mailing machine for facilitating the production postage indicia printed tape strip which can be adhered to packaged mail. The tape module is integrated into the mailing machine so as not to detract from the speed capability of the mail machine to nominally process envelope mail.

It is a further objective of the present invention to present a tape module which has the capability of accommodating at least two types of tapes for selective application of a postage indicia.

The tape module of the present invention is particularly suited for employment in a novel postage meter mailing machine having an increased throughput capability, in part, resultant from providing the mailing machine with a single process station whereat an envelope can be weighed and an postage value indicia applied. The mailing machine includes a transport assembly for properly positioning an envelope in the process station. The envelope is fed to the mailing machine transport assembly by a suitable envelope feed apparatus, such as, a mixed mail feeder. After the envelope has been weighed and imprinted at the process station, the transport assembly assume control over the envelope again and ejects or discharges the envelope from the mailing machine.

The mailing machine process station is comprised of an integral scale suitable adapted to accommodate the transport assembly, an envelope sealing assembly complimentary to the transport assembly is optionally provided, a vertically displaceable flat printing platen and a postage meter support assembly for supporting a suitably attached postage meter. By employing a multiple function processing station the mailing machine throughput is substantially increased by facilitating minimum time lag between functional operations on each envelope and eliminating the transportation time required by multiple process station systems.

Generally the scale is isolation mounted to the mailing machine base and includes a plurality of slots in the weighing plate of the scale. The weighing plate has mounted thereto a plurality to support members having a generally C-configuration. The support members have fixably mounted thereto a envelope clamping assembly which functions to clamp an envelope to the weighing plate during weighing and to promote transport of the envelope.

The transport assembly is comprised of a plurality of rollers independently supported by the mailing machine base in a manner which permits the rollers to assume a vertically engaged position (up position) in communication with the clamping assembly or a vertically disengaged position (down position) out of communication with the clamping assembly. Each roller is aligned to journey partly through a respective slot in the up position. A bi-directional drive motor assembly is in communication with each roller via a endless belt. The drive motor assembly includes a one way clutch interactive with the transport assembly such that motor actuation in a first direction results in the endless belt imparting a driving force to each roller and motor actuation in the second direction causes the transport assembly to reposition the rollers in the second position.

The sealing assembly is mounted in the mailing machine in a suspended manner over a portion of the weighing plate of the scale and includes a plurality of sealing members selectively positionable in a first position being biased downwardly and a second position being placed in a upwardly retracted position. In the first position, a plurality of the sealing members are biased other ones of the transport rollers.

The mailing machine further includes a vertically displaceable platen assembly mounted to the base of the mailing machine and aligned for cooperatively acting with a suitable postage meter mounted to the postage meter support assembly.

The tape module a support means for supporting a tape track in a generally cantilevered manner to extend generally below the meter module located to one side of the meter module. The tape module can be selectively positioned in a first position such that the tape track is located longitudinally below and vertically between the printing means of the meter module and the platen assembly. In a second position of the tape module, the tape track is positioned longitudinally below and longitudinally in spaced relationship to the printing means of the meter module and the platen module. The tape module includes a tape feed which can selectively deliver to the tape track one of two type of tape for imprinting by the meter module.

The mailing machine further includes an inking mechanism for depositing ink on the meter print elements and a tape dispensing mechanism.

Other capabilities and advantages of the present invention will be apparent or presented in the following detailed description of the invention.

DETAILED DESCRIPTION OF THE PREFERRED EMBODIMENT

The novel postage meter mailing machine particularly suited for employment of the present invention employs a novel modular architecture. That is, the mailing machine is comprised of subsystems which are not interdependent. Therefor, the mailing machine can be configured to include only those subsystems modules necessary to meet particular operational needs for a given application environment or, alternatively, the mailing machine can be configured to include the full array of subsystems modules providing maximum application flexibility. For example, where the used environment is restricted to processing uniform mail, the scale module, subsequently described, may be omitted in substantial portion from the mailing machine without affecting the system performance of remaining modules or the system controller.

Figure 1:
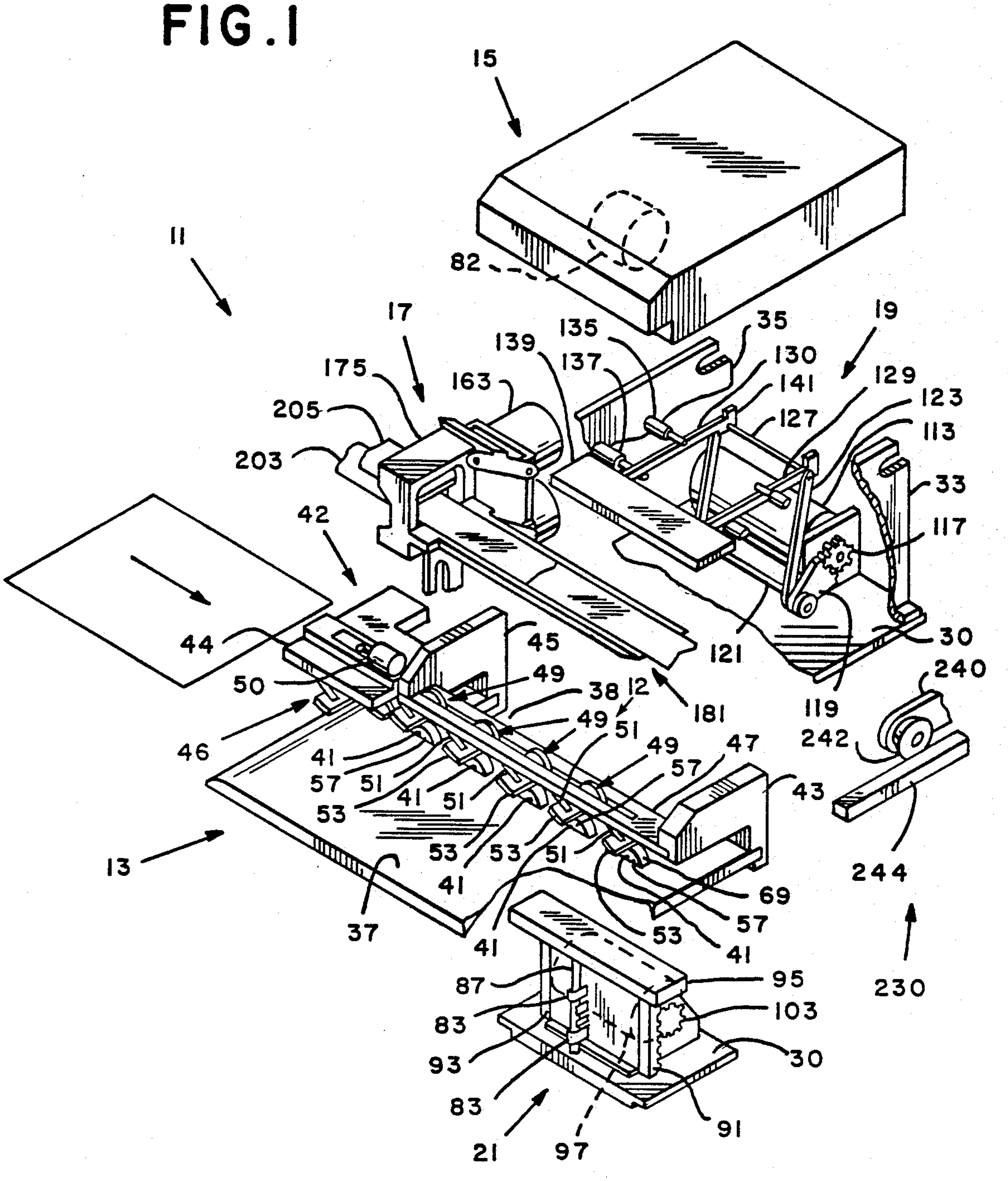
FIG. 1 is a sectioned exploded view of a mailing machine in accordance with the present invention.
Figure 2:
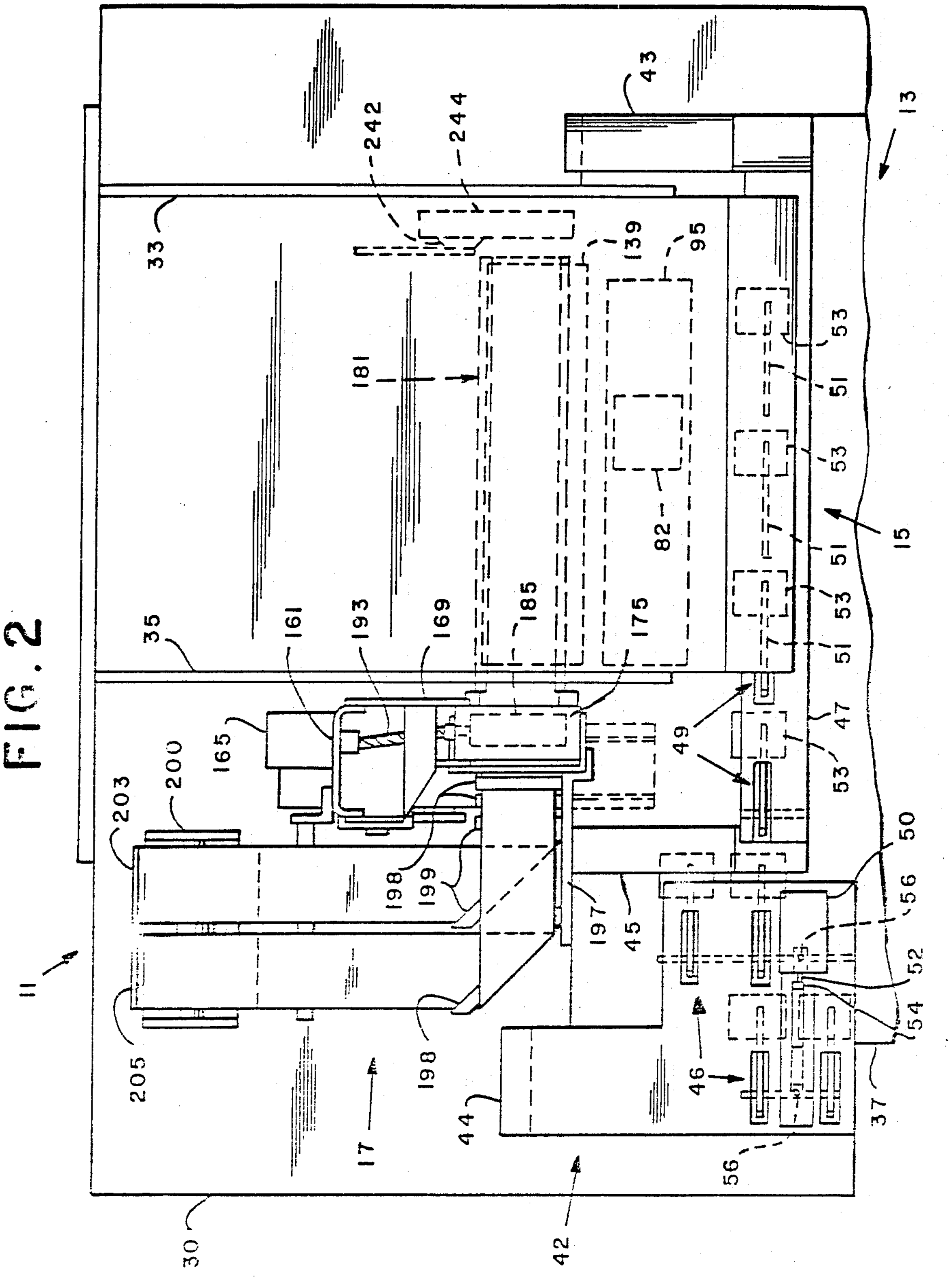
FIG. 2 is a top view of the mailing machine.

Referring to FIGS. 1 and 2, a mailing machine, generally indicated as 11, employs a novel subsystems modular architecture comprising a scale module 13, a transport module 12, a postage meter module 15, a tape feed module 17, a inking module 19, and a platen module 21. The modules are located within the mailing machine 11 such that the scale module 13 is located frontwardly of parallel support walls 33 and 35 of the mailing machine 11. The support walls 33 and 35 are fixably mounted to the mailing machine base 30 in lateral spaced apart relationship. Mounted to the base plate 30 between the support walls 33 and 35 is the ink module 19. Mounted above the ink module 19 to the support walls 33 and 35 is the postage meter module 15. The platen module 21 is mounted to the base 30 just below a registration portion of the postage meter 15, to be described more fully later. In addition, the mailing machine has mounted to the wall 35 the tape feed module 17 of the present invention coactive in the preferred embodiment with a tape cutting mechanism 230.

Figure 3:
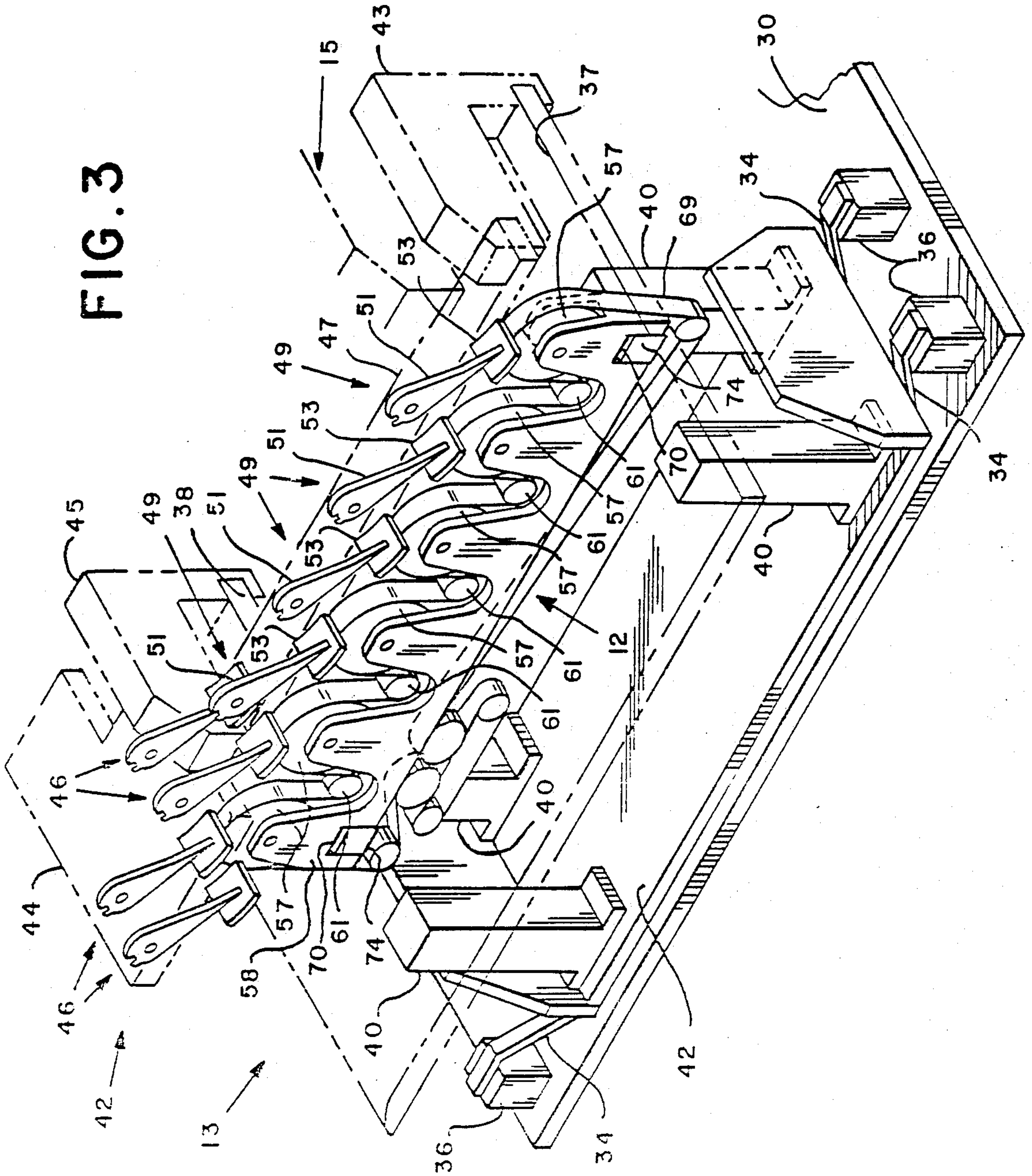
FIG. 3 is a perspective view of a portion of a scale module and transport module in accordance with the present invention.

Referring to FIGS. 1 and 3, the scale module 13 most suited for the present invention is of the resilient type more fully described in U.S. Pat. No. 4,778,018, filed July 7, 1987, entitled APPARATUS AND METHOD OF DETERMINING THE MASS OF AN ARTICLE BY MEASURING THE SHIFT IN THE PERIOD OF HARMONIC MOTION, herein incorporated by reference. Briefly, the resilient type scale, most suited and described in the noted applications, utilizes the principles of harmonic vibration for the purpose of determining the weight of an article. A flexibly mounted platform (inclusive of members 37, 40, 43, 45, 47 and 49) is caused to oscillate by an initial excitation action (not here shown). The frequency of the oscillation is primarily dependent upon the total mass of the platform, and anything connected thereto, such as, envelope residing on the platform, and the platform spring constant. As a result the mass of an envelope residing on the platform can be determined and a weight assigned by comparing the oscillation obtained subsequent to residence of the envelope with the know nominal oscillation. For the purpose of brevity, the heredescribed portion of the scale module 13 represents that portion of the resilient type scale necessary to illustrate the scales' interrelationship with the mailing machine 11.

Referring particularly to FIGS. 1, 2, and 3, the scale module 13 is of the resilient type and includes a weighing plate 37 supported by vertical beam members 40 at one of their respective ends. The other end of each beam member 40 is fixably mounted to a counter plate 42. The mailing machine base 30 includes a plurality of scale support post 36 each support post 36 including a flex member 34. Each flex member 34 is fixably mounted to the counter plate 42 in such a way as to provide isolation mounting for the scale module 13 from the base 30.

The weighing plate 37 is generally rectangular in shape and includes a longitudinally extending recess 38 formed along the rearward side of the weighing plate 37 also formed in the weighing plate are a plurality of co-linearly aligned slots 41 (not shown in FIG. 3 for the purpose of clarity). A first generally C-configuration clamp 43 is fixably mounted along the rearward side of the weighing plate laterally to one side of the recess 38. A second generally C-configured clamp 45 is fixably mounted to the rearward side of the weighing plate 37 laterally to the other side of the recess 38. A support beam 47 (shown in phantom in FIG. 3 for the purpose of clarity) is fixably mounted at its ends to the respective clamps 43 and 45. Rotatably mounted by conventional means to the support beam 47 is a plurality of clamping members 49 each of which is mounted such that it is positioned over a respective one of said slots 41. Each of the clamping members 49 includes a mounting arm 51 rotatably mounted to the support beam 47 at one end and biased downwardly by any conventional means such as a spring. The other end of the mounting arm 51 has fixably mounted thereto a generally arched flange member 53 laterally sized to prevent the flange member 53 from venturing into a respective slot 41.

It should be appreciated that to the extent that the weighing function is not desired to be included, the scale module may be eliminated. The only modification or substitution necessary is the employment of a transport plate, of like construction to the weighing plate 37. The transport plate can be fixably mounted directly to mailing machine base 30, inclusive of the clamps 43 and 45, support bean 47 and clamp member 49. The members 43, 45, 47 and 49, in the preferred embodiment of this invention, are maintained for interaction with the transport module in a manner hereafter described.

It is noted that as viewed in FIGS. 1, 2, 3, and 4, the preferred embodiment of the present invention includes a sealing module, generally indicated as 42. The sealing module 30 is cOmprised of a generally L-shaped support member 44. The support member 44 is fixably mounted at one end to the mailing machine base 30. The other end of the support member 44 rotatably supports a plurality of sealing members 46 biased downwardly by a respective spring 48. The sealing members 46 are aligned longitudinally in a generally staggered relationship and include tab 56. A solenoid 50 is fixably mounted to the support member 44 such that the solenoid piston arm 52 abuts a portion of a transfer link 54 slidably mounted to the support member 44. The transfer link 54, in part, abuts the respective sealing member tab 56. Actuation of the solenoid 50 causes the solenoid piston arm 52 to displace the transfer link 54 which thereby causes the sealing members 46 to rotate to a spaced apart relationship to the weighing plate 37 during the weighing process.

Figure 4:
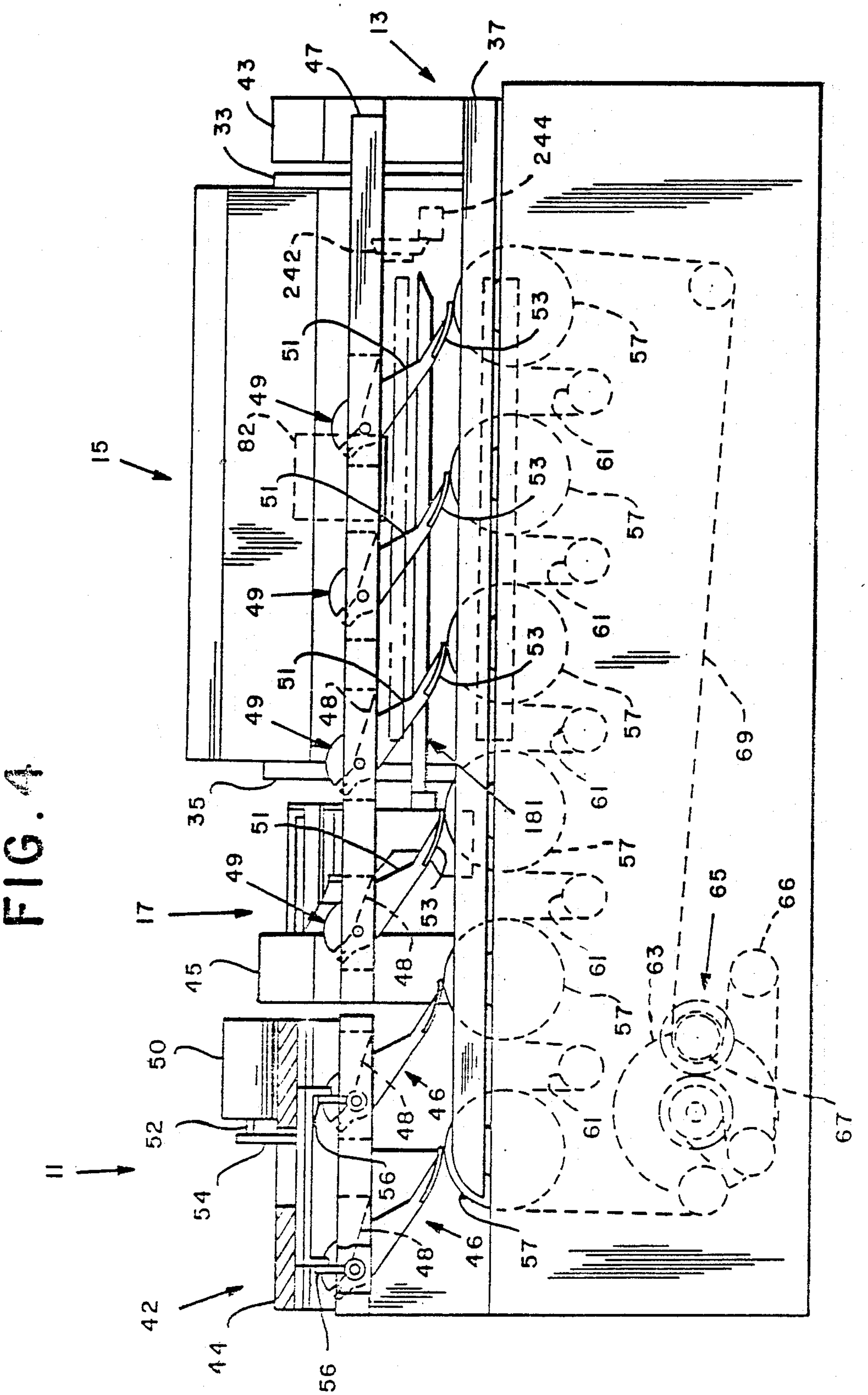
FIG. 4 is a sectioned elevational view of the mailing machine.
Figure 5:
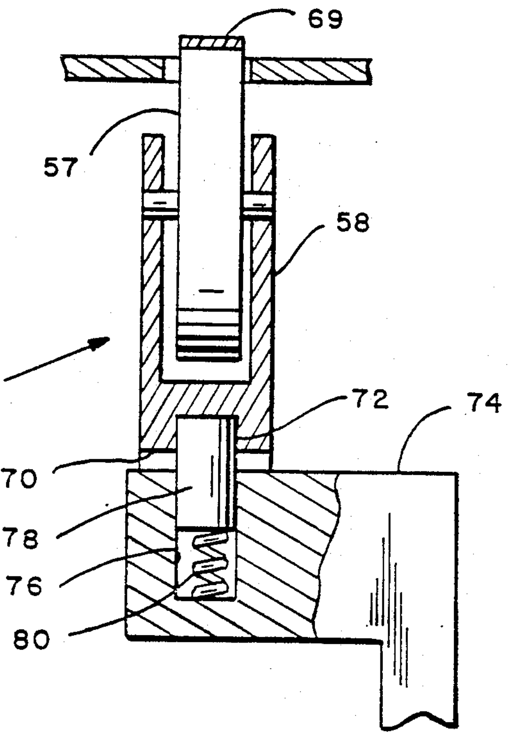
FIG. 5 is a section side view of the transport module frame support member.

Referring to FIGS. 3, 4, and 5, the transport module 12 is comprised of a plurality of first guide rollers 57 which are rotatably mounted to a frame 58 (best shown in FIGS. 3 and 4). The frame 58 includes support seats 70, each seat 70 having a resident seat 72. A plurality of generally L-shaped support members 74 are fixably mounted at one end to the base 30 such that they do not interfere with the weighing plate 37 of the scale module. The other end of the support member 74 is receive in a respective seat 70 of the frame 58. Each support member 74 includes a seat 76 having a guide pin 78 biased in the vertically upward direction by a spring 80 residing therein. A portion of the guide pin 78 also, in part, resides in the seat 72 of the respective frame seat 72.

Also rotatably mounted to the frame 58 is a plurality of rollers 61 positioned vertically downwardly from and between an adjacent guide rollers 57. Fixably mounted by any conventional means so as not to interfere with the operation of the scale module 13 to the base 30 of the mailing machine is a bi-directional drive motor 63 and associated drive train, generally indicated at 65. An endless belt 69 is placed in driving communication with the drive train 65 which includes a one way clutch arrangement, generally indicated as 67. The endless belt 69 is positioned in a serpentine manner around rollers 57 and 61 thereby providing driving communication between the drive motor 63 and the rollers 57.

When belt 69 is driven in the envelope feed direction of the mailing machine by the drive motor 63 as permitted by the one-way clutch 67, the frame 58 will assume the nominal or first position pursuant to the urging of the spring biased guide pin 78. In the first position, the rollers 57 are positioned by the frame 58 to extend through and slightly above a respective slot 41 in the weighing platform 37. When the belt 69 is driven in a reverse direction to the envelope feed direction, the one-way clutch prevents continues displacement of the belt 69 causing the belt 69 to impart a downward force on the frame 58 overcoming the biasing force of the springs 80. As a result, the frame 58 is displaced downward to a second position causing the rollers 57 to be withdrawn from the slots 41. It is noted that the drive train 65 includes a take-up roller 66 biased in a conventional manner such that when the frame 58 is in the second position the take-up maintains the belt 69 in a taut condition.

It is now apparent that when the rollers 57 are withdrawn from the slots 41, the clamps 47 bias an envelope on the weighing plate thereagainst which facilitates the weighing process. When the rollers 57 are journeyed partially into the slots 41, the clamps 47 assist the transport function.

Figure 6:
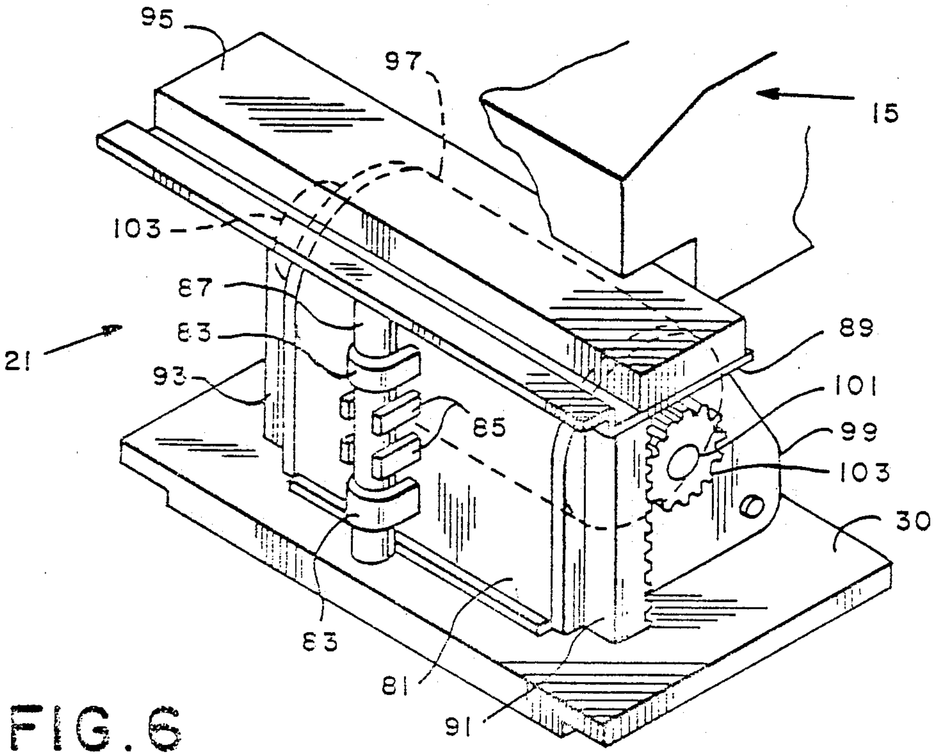
FIG. 6 is a perspective view of a platen module in accordance with the present invention.

Referring to FIGS. 1, 2, 4, and 12 and more particularly FIG. 6, as afore noted, the postage meter 15 is mounted between the support walls 33 and 35. The postage meter includes a forwardly located registration area, generally indicated as 82. Mounted to the base 30 of the mailing machine just below the register area 82 of the postage meter 15 is the platen module 21. The platen module 21 includes a support wall 81 fixably mounted the base 30. A plurality of C-brackets 83 and guide pins 85 are fixably mounted to one face of the support wall 81 in vertical alignment to allow a platen guide rod 87 to vertically slide along a defined vertical path. A platen guide rod 87 is laterally captured by the C-brackets 83 and guide pins 85. The platen guide rod 87 has fixably mounted to its top a platen plate 89. Also fixably mounted to the platen plate in laterally spaced relationship is a first and second rack post 91 and 93, respectively. Fixably mounted atop the platen plate 89 is a elastomeric material having a generally rectangular shape of uniform thickness.

A drive motor 97 is mounted to and between parallel support brackets 99 such that the rack posts 91 and 93 are outboard of the respective brackets 99. The drive motor 97 includes a drive shaft 101 which extends axially through the drive motor 97. At each end of the drive shaft 101 is fixably mounted a gear 103 aligned to be in constant mesh with a respective rack post 91 and 93. It is now appreciated that actuation of the drive motor 97 can cause the rack post to elevate the platen plate 89 to bring the elastomeric member 95 into engagement with a properly positioned envelope in the meter register projection area and, in so doing, cause an indicia to be imprinted on the envelope.

Figure 7:
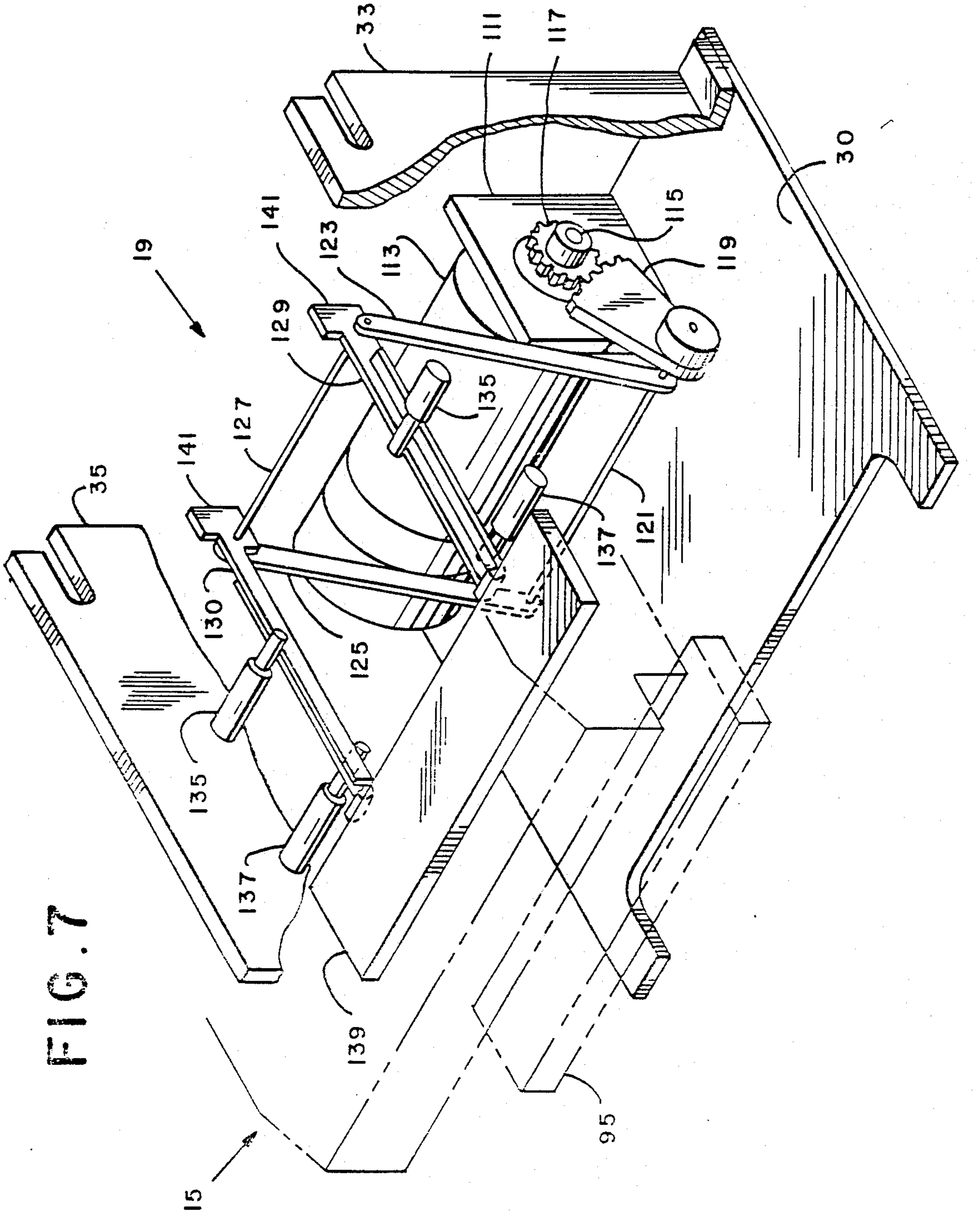
FIG. 7 is a perspective view of a inking module in accordance with the present invention.
Figure 12:
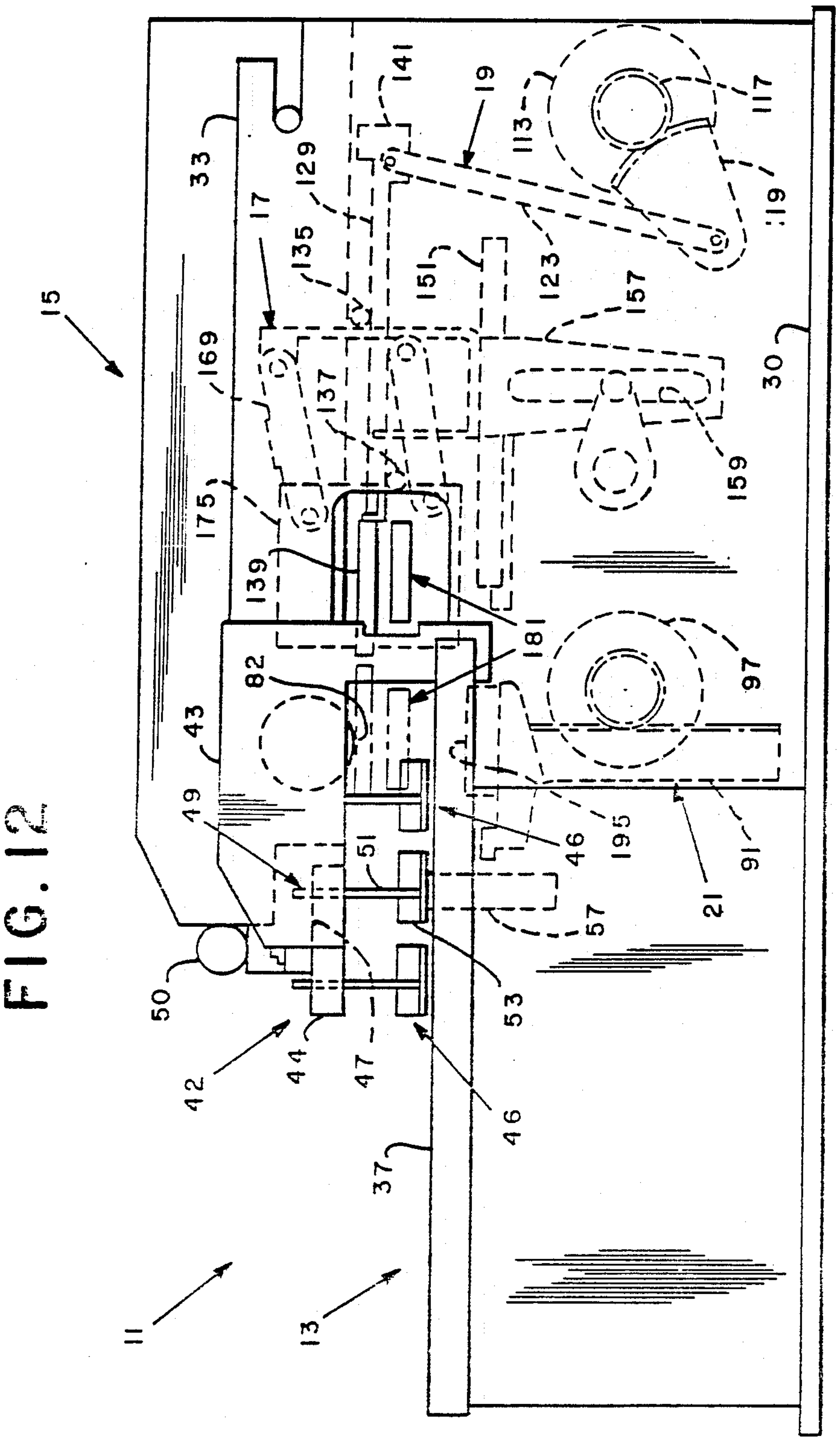
FIG. 12 is a side elevational view of the mailing machine.

Referring now to FIGS. 1, 7, and 12, the inking module 19 is located between the support walls 33 and 35 of the mailing machine 25. A motor mounting plate 111 is fixably mounted vertically to the base plate 30. A drive motor 113 is fixably mounted to the motor mounting plate 111 such that the output shaft 115 extends through the plate 111. Fixably mounted around one end of the output shaft 115 outboard of the plate 111 is a gear 117. A second gear 119 is pivotally mounted to the base 30 in constant mesh with gear 117. A linkage assembly comprised of a driving shaft or first link 121 is fixably mounted to the second gear 119 at one end. Fixably mounted along the first link 121 is a second link 123 and a third link 125 in spaced apart parallel orientation. A fourth link 127 is pivotally mounted at its respective ends to a respective link 125 and 123. A first and second transfer link 129 and 130, respectively, are pivotally mounted in spaced apart relationship at one end to the fourth link 127. Fixably mounted inboard to each of the support walls 33 and 35 is a first guide pin 135 and a second guide pin 137.

Each of the transfer links 129 and 130 extend respectively below a guide pin 135 and above a guide pin 137 such that the guide pins 135 and 137 act to guide the longitudinal displaceable path, respectively, of the transfer links 129 and 130. The guide pins 135 and 137 also provide vertical support. Fixably mounted to the forward end of each of the transfer links is a ink pad well 139 in which an ink pad resides (not shown). At the other end of each of the transfer links 129 and 130 is formed a tilting surface 141. It can therefore be appreciated that upon actuation of the motor 113 the linkage assembly is driven forwardly. The pins 135 are positioned such that when the ink pad tray 139 is positioned just below the register area 82 of the meter 15 the tilt surface 141 is brought into forced engagement with the pin 135 causing the transfer links 130 and 129 to be tilted upwardly elevating the ink pad well 139 into engaging contact with the register area 85 of meter 15.

Referring now to FIGS. 1, 4, 8, 9, 10, and 12, the tape module 17 is slidably mounted to the wall 35 along a track 150 formed along the outboard side of the wall 35. The tape module consist of a rail 151 which is slidably mounted longitudinally to track 150 to define the longitudinal displacement path of the tape module 17. A bracket 155 is fixably mounted to the rail 151. A second bracket 157 having a generally vertically extended slot 159 is mounted to the bracket 155. The bracket 155 includes a back wall 161 which has mounted thereto a first tape drive motor 163 and ,a second tape drive motor 165. The bracket 155 includes a first set of longitudinally aligned bracket flanges 167. Pivotally mounted to each of the flanges 167 is one end of a first pivot arm 169. The bracket 155 further includes a second set of bracket flanges 171 which, in like manner, has pivotally mounted thereto, respectively, one end of a second pivot arm 173. The other end of each pivot arm 169 and 173 is pivotally mounted to a tape guide housing 175.

The tape guide housing 175 has an entrance 177 aligned opposite an exit 179. Fixably mounted in a cantilever fashion to the tape guide housing 175 to extend outwardly from the exit 179 of the tape guide housing 175 is a tape track 181 having a wedged shape feed member 183 extending partially into the tape guide housing 175. The tape track 181 and the feed member 183 are mounted to the side walls of the housing 175 to laterally extend across the exit 179. It is noted that the tape track 181 is comprised of a first and second channeled side walls 174 and 176, respectively, having a strip member 178 supported by and longitudinally between the side walls' channel (ref. to FIG. 8*a*). Rotatably mounted in the tape guide housing 175 is a first and second tape drive roller 185 and 187, respectively. Rotatably mounted in the housing 175 opposite the first drive roller 185 is a first idler roller 189 and, in like manner, a second idler roller 191 is rotatably mounted opposite the second tape drive roller 187. A flexible shaft 193 communicates the first motor 163 to the first tape drive roller 185 and, in like manner, a second flexible shaft 195 communicates the second tape drive motor 165 with the second tape drive roller 187.

Figures 8, 8A:
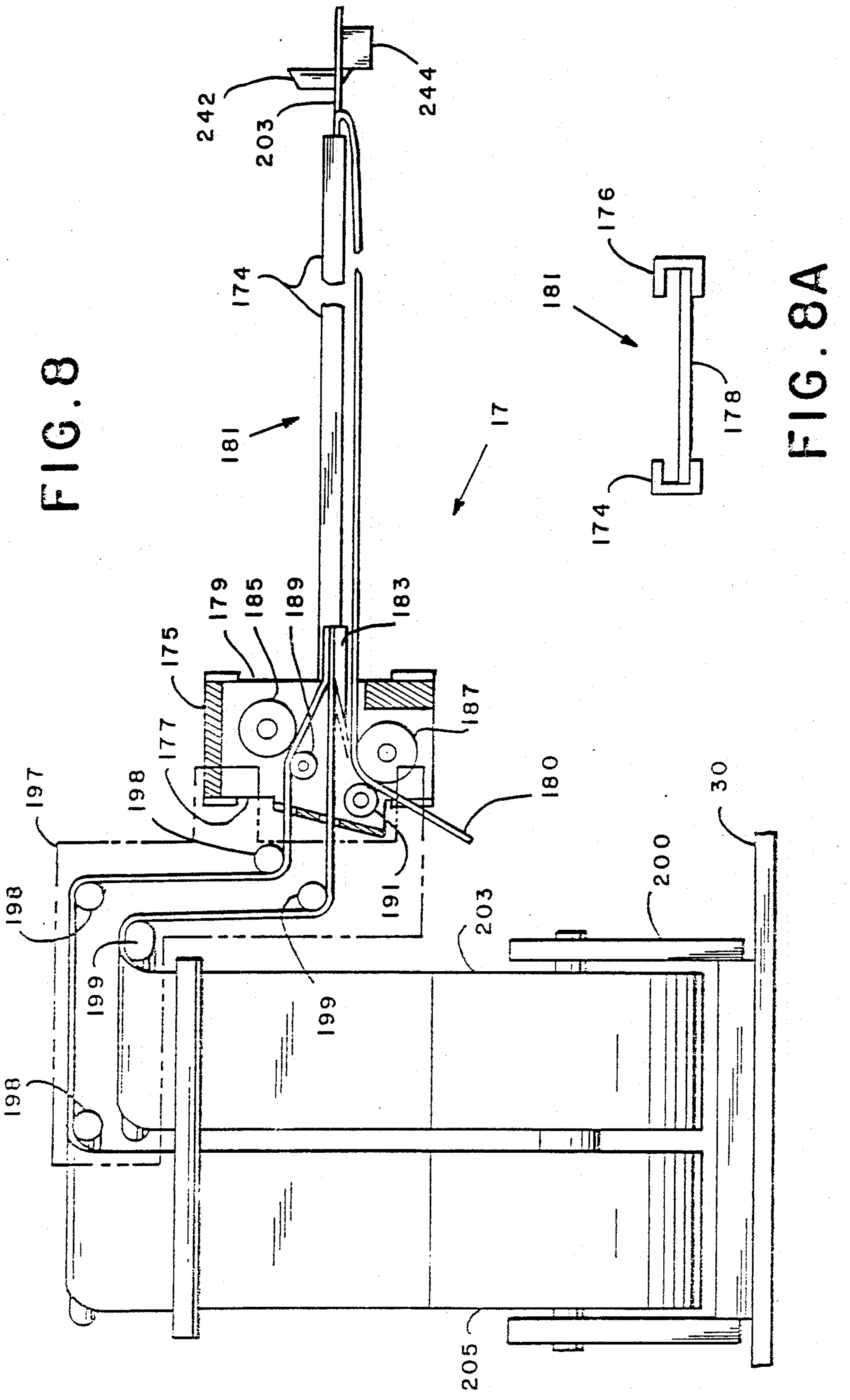
FIG. 8 is a elevational view of a tape module in accordance with the present invention.
FIG. 8*a* is a sectional view of the tape track.
Figure 9:
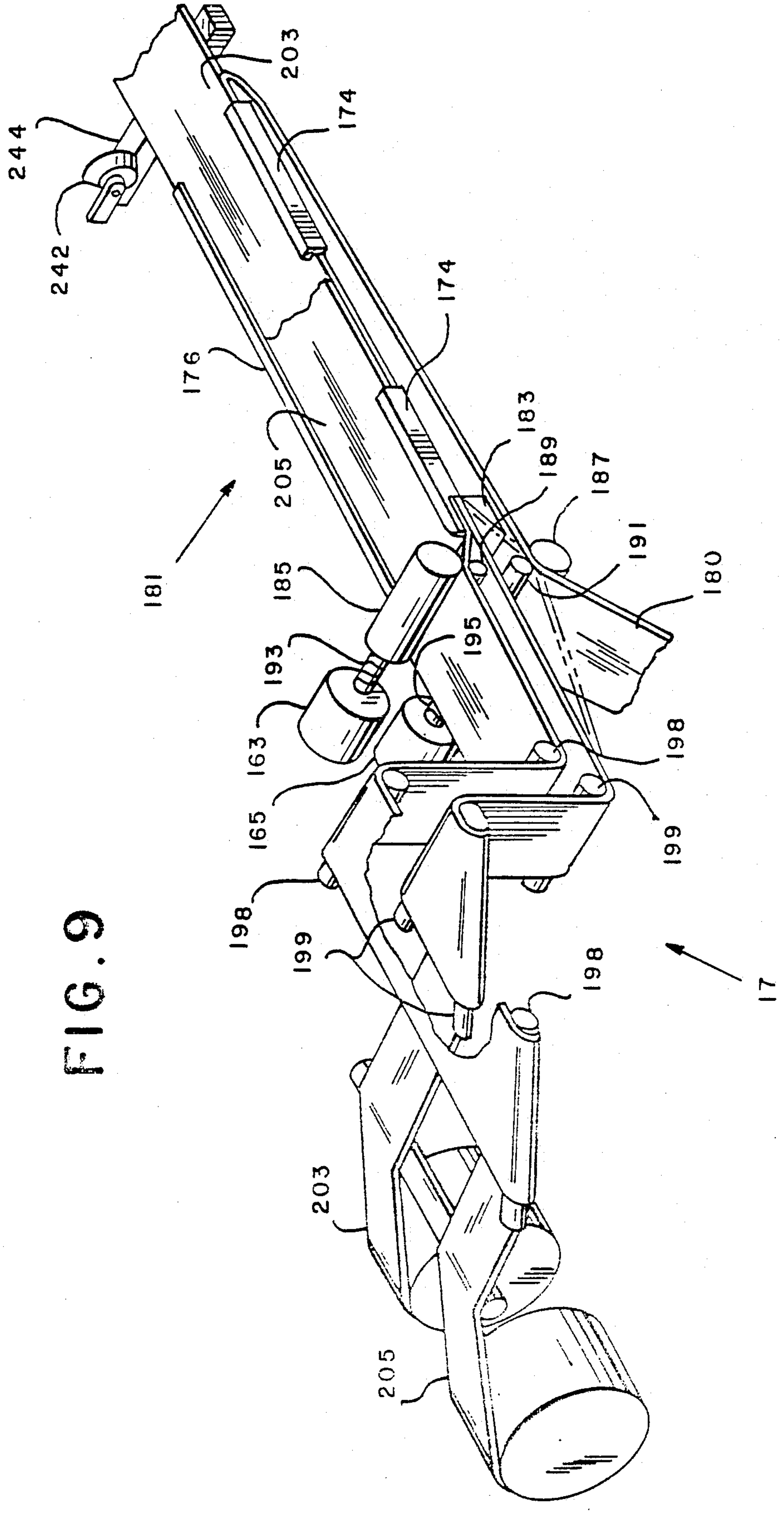
FIG. 9 is a partial perspective view of the tape module.

The housing 175 further includes a flanged portion 197 having fixably mounted thereto a plurality of first guide pins 198 and a plurality of second guide pins 199. A dual tape support assembly 200 is fixably mounted to the base 30 and rotatably supports a first and a second roll of tape 203 and 205, respectively. The first roll of tape 203 is threaded such the the guide pins align the tape 203 for journey into the housing 175 and tape track 181. The tape 203 is located in the tape track 181 so as to be captured between the channeled side walls 174 and 176 resting on the strip 178. As shown in FIG. 8 and in accordance with the preferred embodiment of the invention, the tape 203 is a backing tape supplied with sufficient backing lead such that the backing 180 will extend in a reverse direction below the strip 178 to and between the idle roller 191 and the drive roller 187 such that actuation of the drive roller 187 on the tape backing 180 causes the tape 203 to be advanced and the backing pealed away. The tape 205 is journeyed around the pin 198 to pass between idle roller 198 and drive roller 185 and into the tape track 181 to rest on the tape 203 and captured between the channeled side walls 174 and 176.

Optionally, it may be desired for the tape 203 to be of the non-backing type. As indicated in phantom in FIG. 9, the tape can be optionally threaded directly between rollers 187 and 191 of the track 181.

Figure 10:
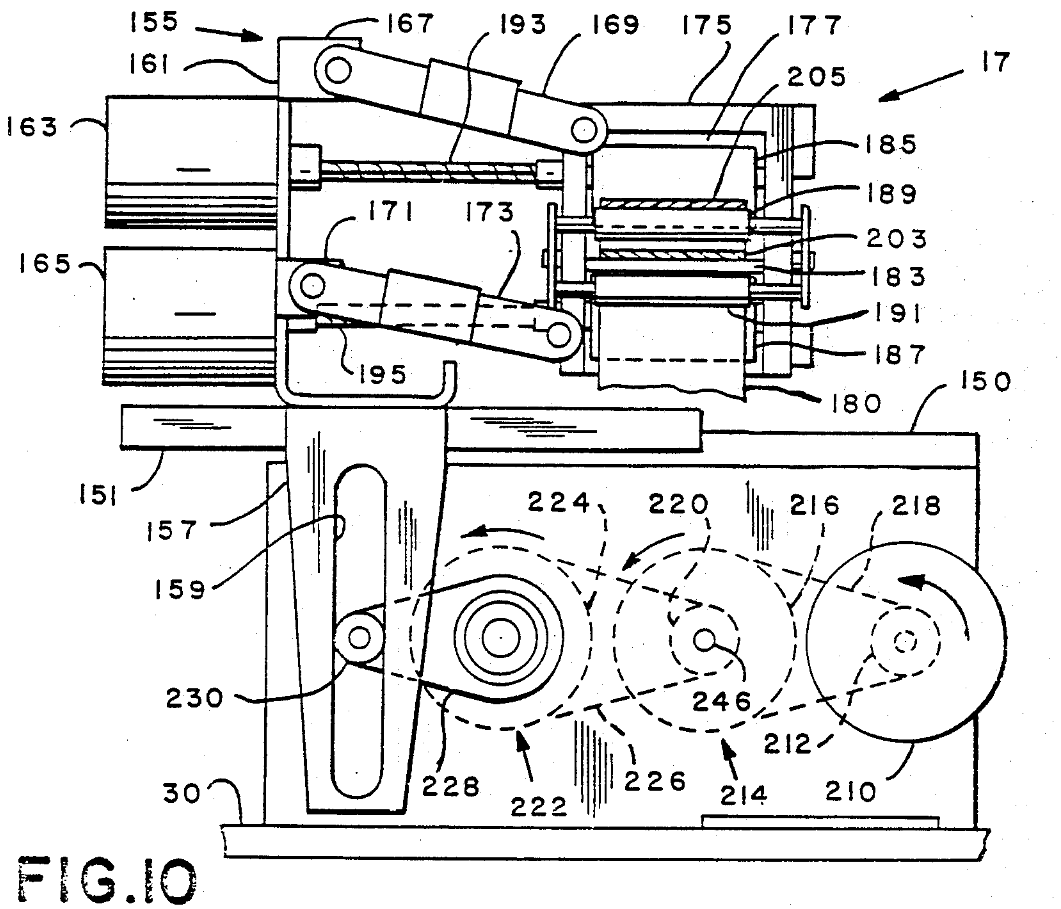
FIG. 10 is a side elevational view of the tape module.

Referring more particularly to FIGS. 10 and 12, the tape module 17 is slidable along a track 150 formed in wall 35 pursuant motivation of second bracket 157. It is noted that the tape module 17 is so positioned relative to the registration area 82 of the postage meter 15 and the platen module 21 such that the track 181 is located in a first position between the postage meter registration area 82 and the platen module 21. In a second position the track 181 is repositioned below the postage meter 15 clear of platen plate 89 travel. The position of the track 150 dependent upon the location of the second bracket 157.

In order to motivate the second bracket 157 and, in turn position the track 181 in the first (as indicated in phantom in FIG. 12) or second position, a motor 210 is fixably mounted to the mailing machine base 30. Fixably mounted around the output shaft of the motor 210 is a pulley 212. Rotatably mounted to the wall 35 is a double pulley assembly 214 which includes a first pulley 216 and second pulley 220. The first pulley 216 is in driven communication with the motor 210 through an endless belt 218 journeyed between the pulleys 212 and 216. A crank assembly 222 is rotatably mounted to the wall 35 and includes a pulley 224 in driven communication with the pulley 220 of the pulley assembly 214 through an endless belt 226. The crank assembly 214 also includes a crank arm 228 having a slide pin 230 residing in the slot 159 of the bracket 157 of the tape module 17.

Motivation of the tape module 17 along the track 150 is accomplished by causing the motor 212 to rotate the pulley 212 in the direction shown in FIG. 10. The rotation of pulley 212 is transferred to pulley 224 of the crank assembly 222 through the double pulley assembly 214 by belts 218 and 216. The rotation of pulley 224 through one-half revolutions causes the tape module 17 to displace from the first position to the second position. Further actuation of the motor 210 causes the pulley 224 to further rotate to complete the revolution resulting in the tape module returning to the first position.

Figure 11:
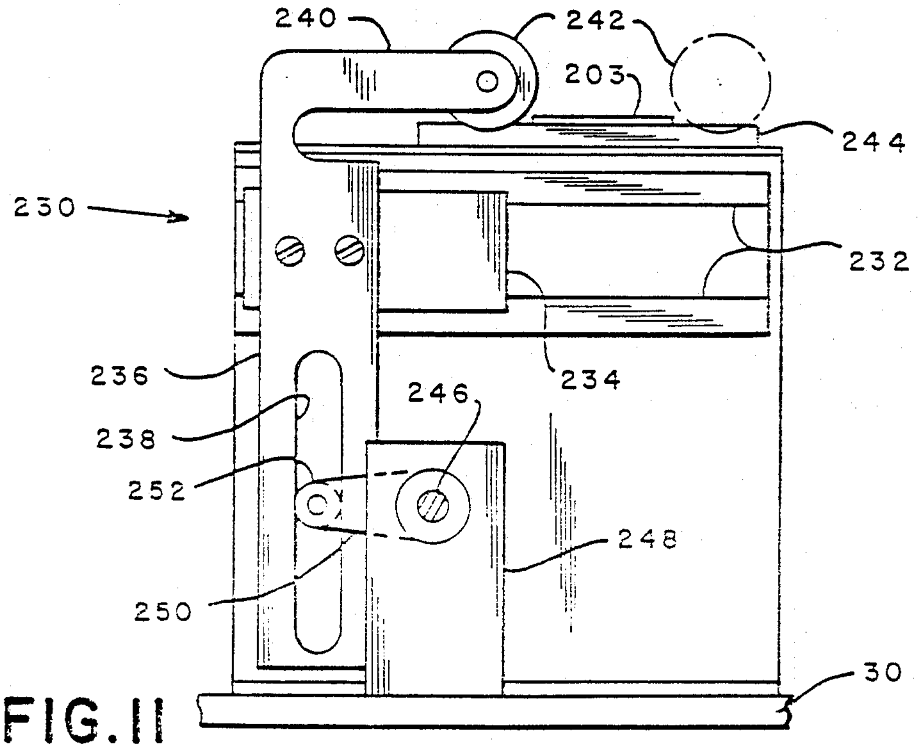
FIG. 11 is a side elevational view of a cutting module in accordance with the present invention.

Referring to FIG. 11, the mailing machine may further include a tape cutter module 230. The tape cutter module 230 is comprised of dual track 232 mounted outboard of the wall 33. A member 234 is slidably mounted to track 232. A lever arm 236 having a vertically directed slot 238 is fixably mounted to the member 234. The lever arm 236 includes a portion 240 which extends in a horizontal cantilevered manner and has a rotary blade 242 rotatably mounted to the end of the lever portion 240. A cutter beam 244 is mounted to the wall 33 to cooperatively act with the rotary blade 242.

Actuation of the cutter module 230 is provided by the motor 210. The double pulley 214 is fixable mounted centrally around a shaft 246 rotatably mounted to the wall 35 by any conventional means. The shaft 246 extends longitudinally to and is rotatably mounted in a support member 248 fixably mounted to the base 30 of the mailing machine. Fixably mounted around a portion of the shaft 246 generally adjacent to the member 248 is a crank arm 250. The crank arm 250 includes a pin 252 slidably captured in the slot 238 of the lever arm 236 such that upon initial one-half rotation the motor 210, acting through the double pulley shaft 246 caused the lever arm 236 to be displaced by the crank arm pin 252 to a second position (indicated in phantom in FIG. 11). Further actuation of the motor 210 causes the pulley 224 to further rotate to complete the revolution resulting in the rotary cutter blade in coaction with the beam 244 to cut a tape 205 segment ejected the past.

It is intended that the mailing machine 11 operate such that the transport module 12 receives a envelope from a suitable feed mechanism (not shown). The transport system properly positions the envelope on the weighing plate relative to the meter module 15. The transport rollers 57 are then caused to withdraw, in the manner aforedescribed, under the influence of the motor 63. Simultaneously, the inking module 19 has been actuated, in the manner aforedescribed, to apply imprinting ink to the registration area 85 of the postage meter module 15 and withdrawn to the first position prior to the arrival of the envelope. Upon the arrival of the envelope in proper position at the process station and withdrawal of the transport rollers 57, scale module 13 will weigh the envelope, in a manner described in U.S. Pat. No. 4,778,018, and inform the meter for meter setting, in a manner described in co-pending application Ser. No. 376,175, filed July 6, 1989 entitled PRINTWHEEL SETTING DEVICE FOR A POSTAGE METER. Subsequent to weighing of the envelope the platen module 21 is actuated, in the manner as aforedescribed, to result in the imprinting of an indicia on the envelope. Simultaneously with actuation of the platen module 21 or pursuant to a minimum time lag, the transport module 12 can be reactivated or further activated to return the rollers 57 to their first position. Upon obtainment of the first position of the rollers 57, the envelope is discharged from the mailing machine. Simultaneously with commencement of discharge of the process station envelope from the process station, a new envelope may be received by the transport module 12.

In the preferred embodiment of the present invention, the tape module 17 can be positioned, in the manner aforedescribed, for imprint of a indicia on one of the tapes 203 or 205 carried by the tape module 17. It is noted the vertical elevation of the tape track 181 is below the vertical position of the ink pad well 139 such that the tape track 181 does not interfere with the operation of the inking module 17.

Should it be desired to imprint an indicia on the tape 205, it is only necessary to actuate the platen drive motor 97. Inking can then occur after each cycle of the platen drive motor 97. Subsequent to imprinting, the tape drive motor 163 will cause the induced portion of the tape 205 to be ejected and cut, in a manner as aforedescribed, by the cutter module 203. In order to imprint on tape 203, the described is again followed with the exception that prior to imprinting the tape 205 is drawn in a reverse direction by the taped drive motor 163 to expose the tape 203 to the meter register area. The indiced tape portion of tape 203 being ejected under the influence of type drive motor 165.

It should now be well appreciated that the invention as afore described has been described in its preferred embodiment and in its preferred environment and the description should not be taken is limiting.

What is claimed is:

1. A mailing machine comprised of a plurality of modules, each of said modules mounted in said mailing machine to form a single process station, said mailing machine having a base and a plurality of support walls, wherein said modules comprise:

- a scale module having means for weighing an envelope, means including a weighing plate with a recess formed therein;
- a transport module having means for positioning said envelope in said process station and ejecting said envelope from said process station;
- a meter module having a registration area and a printing means located in said registration area for imprinting an indicia on said envelope, said registration area being vertically aligned to and spaced above said recess in said weighing plate;

a platen module having a platen plate and an elastomeric member fixably mounted to a first surface of said platen plate;

platen support means for supporting said platen plate such that said elastomeric member is opposite said registration area of said meter module and for selectively positioning said platen module in a first position wherein said elastomeric member is in close proximity to said printing means of said meter module and a second position wherein said elastomeric member is positioned generally below said weigh plate of said scale module, and a tape module, including, a tape track, means for supporting said tape track in a generally cantilevered manner;

tape positioning means for selectively positioning said tape track supporting means in a first position, between said meter module and said platen module and in second position laterally removed from said first position and below said meter module;

tape feed means for selectively feeding a tape to and through said tape track such that said fed tape resides within said tape track when said tape track is in said first position;

said mailing machine having a support surface; and said tape positioning means comprising:

a rail track fixably mounted to said support surface;

a rail mounted for sliding motion along said rail track; said tape track supporting means being fixably mounted to said rail;

a bracket fixably mounted to said tape track supporting means, said bracket having an elongated slot formed therein;

a crank rotatably mounted to said support surface and having a pin slidably mounted in said slot of said bracket such that rotation of said crank causes said rail to displace along said rail track; and drive means for rotatably displacing said crank.

2. A mailing machine as claimed in claim 1, wherein said tape feed means comprises:

a plurality of tape drive motors fixably mounted to said tape track supporting means;

a plurality of tape drive rollers rotatively mounted in said tape track supporting means, each of said tape drive rollers being in driven communication with a respective one of said tape drive motors; and, a plurality of idle rollers rotatably mounted in said tape track supporting means opposite a respective drive roller, whereby a plurality of imprinting tapes may be respectively threaded between said set of tape drive rollers and idle rollers into said track such that a desired one of said imprinting tapes may be exposed in said tape track.

3. A mailing machine comprised of a plurality of modules, each of said modules mounted in said mailing machine to form a single process station, said mailing machine having a base and a plurality of support walls, wherein said modules comprise:

a plate fixably mounted to said base and having a recess formed therein;

a transport module having means for positioning said envelope in said process station and ejecting said envelope from said process station;

a meter module having a registration area and a printing means located in said registration area for imprinting an indicia on said envelope, said registration area being vertically aligned to and spaced above said recess in said plate;

a platen module having a platen plate and an elastomeric member fixably mounted to a first surface of said platen plate, platen support means for supporting said platen plate such that said elastomeric member is opposite said registration area of said meter module and for selectively positioning said platen module in a first position wherein said elastomeric member is in close proximity to said printing means of said meter module and a second position wherein said elastomeric member is positioned generally below said plate, and a tape module, including, a tape track, means for supporting said tape track in a generally cantilevered manner;

tape positioning means for selectively positioning said tape track supporting means in a first position, between said meter module and said platen module and in a second position laterally removed from said first position and below said meter module;

tape feed means for selectively feeding a tape to and through said tape track such that said fed tape resides within said tape track when said tape track is in said first position;

said mailing machine having a support surface; and said tape positioning means comprising:

a rail track fixably mounted to said support surface;

a rail mounted for sliding motion along said rail track; said tape track supporting means being fixably mounted to said rail;

a bracket fixably mounted to said tape track supporting means, said bracket having an elongated slot formed therein;

a crank rotatably mounted to said support surface and having a pin slidably mounted in said slot of said bracket such that rotation of said crank causes said rail to displace along said rail track; and drive means for rotatably displacing said crank.

4. A mailing machine as claimed in claim 3, wherein said tape feed means comprises:

a plurality of tape drive motors fixably mounted to said tape track supporting means;

a plurality of tape drive rollers rotatively mounted in said tape track supporting means, each of said tape drive rollers being in driven communication with a respective one of said tape drive motors; and a plurality of idle rollers rotatably mounted in said tape track supporting means opposite a respective drive roller, whereby a plurality of imprinting tapes may be respectively threaded between said set of tape drive rollers and idle rollers into said tape track such that a desired one of said imprinting tapes may be exposed in said tape track.

* * * * *